(12) United States Patent
Kim et al.

(10) Patent No.: US 8,968,425 B2
(45) Date of Patent: Mar. 3, 2015

(54) METHOD FOR PRODUCING RENEWABLE FUEL USING SUPERCRITICAL FLUID

(75) Inventors: Jaehoon Kim, Seoul (KR); Jong Min Park, Seoul (KR); Jae Young Han, Incheon (KR); Seok Ki Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 365 days.

(21) Appl. No.: 13/451,834

(22) Filed: Apr. 20, 2012

(65) Prior Publication Data

US 2013/0174475 A1    Jul. 11, 2013

(30) Foreign Application Priority Data

Jan. 5, 2012 (KR) .................. 10-2012-0001584

(51) Int. Cl.
*C10L 1/00* (2006.01)
*C10L 1/04* (2006.01)
*C10G 3/00* (2006.01)

(52) U.S. Cl.
CPC .... *C10L 1/04* (2013.01); *C10G 3/44* (2013.01)
USPC .......................................................... 44/307

(58) Field of Classification Search
CPC .............. C10L 1/04; C11C 3/23; C10G 3/44; C10G 3/48; C10G 3/50
USPC ............................................................ 44/307
See application file for complete search history.

(56) References Cited

U.S. PATENT DOCUMENTS

| 4,300,009 | A | | 11/1981 | Haag et al. | |
| 4,992,605 | A | * | 2/1991 | Craig et al. | 585/240 |
| 5,705,722 | A | | 1/1998 | Monnier et al. | |
| 6,180,845 | B1 | * | 1/2001 | Catallo et al. | 585/240 |

FOREIGN PATENT DOCUMENTS

| KR | 1020090054285 A | | 5/2009 |
| KR | 1020110115793 | * | 10/2011 |
| KR | 1020110115793 A | | 10/2011 |

* cited by examiner

*Primary Examiner* — Cephia D Toomer
(74) *Attorney, Agent, or Firm* — Ladas & Parry LLP

(57) ABSTRACT

Disclosed is a method for producing a renewable fuel using a supercritical fluid. The method includes charging a supported catalyst into a continuous reactor and adding a catalyst activating material thereto to activate the supported catalyst, feeding an oil or fat, hydrogen and a supercritical fluid into the continuous reactor and allowing hydrogenation and hydrodeoxygenation reactions of the oil or fat in the supercritical fluid to proceed, and collecting a renewable fuel as the reaction product. The method enables the production of an oxygen-free renewable fuel in a higher yield at a lower hydrogen pressure and a lower reaction temperature than conventional methods for producing renewable fuels.

17 Claims, 2 Drawing Sheets

METHOD FOR PRODUCING RENEWABLE FUEL USING SUPERCRITICAL FLUID

CROSS-REFERENCE TO RELATED APPLICATIONS

This application claims priority under 35 U.S.C. §119 to Korean Patent Application No. 10-2012-0001584 filed on Jan. 5, 2012, in the Korean Intellectual Property Office, the disclosure of which is incorporated herein by reference in its entirety.

BACKGROUND OF THE INVENTION

1. Field of the Invention

The present invention relates to a method for producing an oxygen-free renewable fuel in a higher yield via hydrogenation and hydrodeoxygenation reactions of an oil or fat in a supercritical fluid at a lower hydrogen pressure and a lower reaction temperature than conventional methods for producing renewable fuels.

2. Description of the Related Art

In recent years, energy resource depletion and environmental pollution problems associated with the excessive use of fossil fuels have led to the widespread utilization of renewable, sustainable and highly environmentally friendly fuels based on non-fossil fuel sources. Biodiesel, a kind of biofuel, is considered as the most practical new renewable energy source and has been investigated worldwide for its use as a direct fuel or an additive.

A typical biodiesel production method is depicted in Reaction Scheme 1:

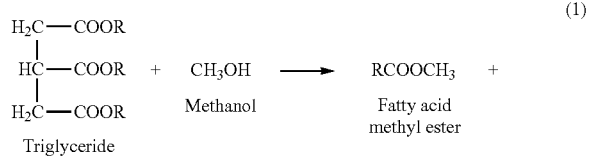

(1)

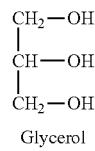

Glycerol

That is, transesterification of a triglyceride present in a vegetable oil or fat, an animal oil or fat or waste cooking oil with an alcohol in the presence of an acid or alkali catalyst affords a fatty acid methyl ester (FAME). For example, one triglyceride molecule reacts with three methanol molecules to produce three FAME molecules and one glycerol molecule. The FAME is used as biodiesel that substitutes for fossil fuel-based diesel.

FAME biodiesel has an advantage in that it can be applied to engine structures and mechanisms of current diesel fueled vehicles. However, the presence of ester groups containing oxygen atoms and double bonds in the FAME molecules often causes stability problems during long-term storage, such as sludge and sediment formation. Further, FAMEs cause softening, swelling, hardening and cracking of rubbers which are used as seals of engine parts and fuel supply systems due to their intrinsic molecular properties, resulting in fuel leakage during long-term use. The presence of oxygen atoms makes FAMEs highly soluble in water. When FAME biodiesel is applied to diesel engine vehicles, free fatty acids can cause corrosion of the engine systems including metal parts, such as internal control units and fuel injection nozzles. In addition, FAMEs are known to produce higher nitrogen oxide (NOx) emissions due to the presence of oxygen atoms therein when compared to typical fossil fuel-based diesel.

The above mentioned problems of FAMEs are caused by the formation of difficult-to-separate free fatty acids in FAME-based biodiesel and the presence of oxygen atoms in the FAME molecules. Accordingly, it is believed that the problems at issue in current FAME biodiesel can be overcome by the production of renewable fuels that contain no oxygen while producing the same molecular formula as existing fossil fuel-based fuels.

In view of this, many proposals have been made on methods for producing oxygen-free hydrocarbon-based materials from oils and fats. An exemplary method is depicted in Reaction Scheme 2:

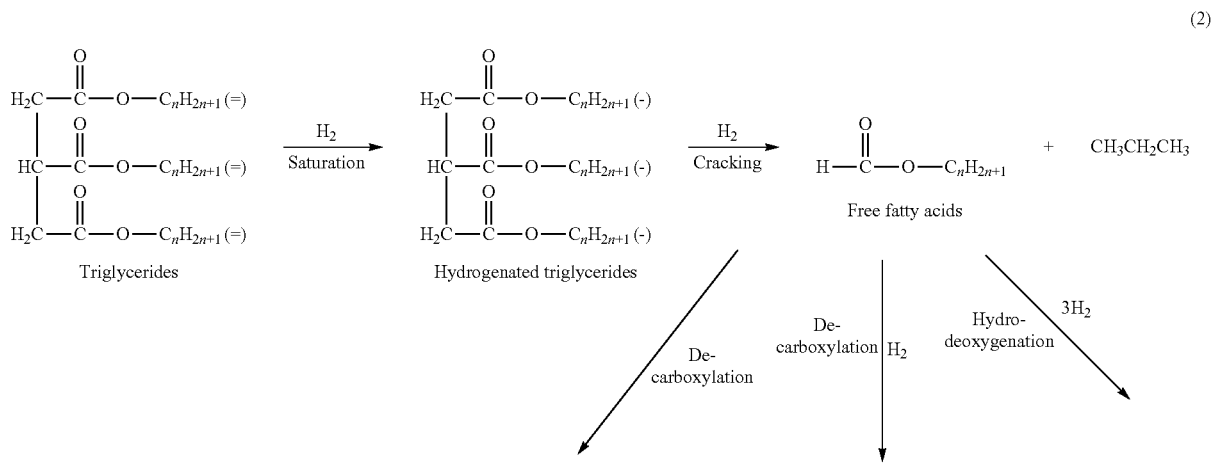

(2)

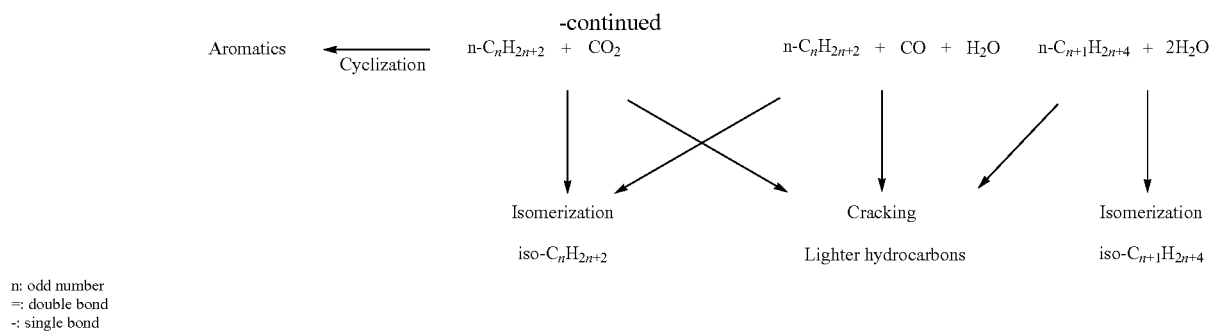

n: odd number
=: double bond
-: single bond

This method involves hydrogenation and hydrodeoxygenation to saturate the double bonds present in the triglycerides with hydrogen to single bonds in the presence of a suitable catalyst, followed by three major reaction pathways, i.e. decarboxylation, decarboxylation or hydrodeoxygenation, to produce an oxygen-free renewable fuel.

U.S. Pat. No. 4,300,009 suggests a process for manufacturing hydrocarbon-based compounds suitable for use as fuels of gasoline engines via hydrodeoxygenation and cracking reactions of corn oil, castor oil or tall oil as a raw material in the presence of highly crystalline zeolite as a catalyst. Further, U.S. Pat. No. 4,992,605 suggests a process for producing $C_{15}$-$C_{17}$ paraffins suitable for use as fuels of diesel engines via hydrodeoxygenation of canola oil, sunflower oil or rapeseed oil as a raw material in the presence of cobalt-molybdenum (Co—Mo) as a catalyst. Further, U.S. Pat. No. 5,705,722 suggests a process for producing a material suitable for use as a diesel fuel cetane number improver via hydrodeoxygenation of relatively inexpensive oils and fats, such as tall oil, waste cooking oil and animal oils and fats, as raw materials in the presence of nickel-molybdenum (Ni—Mo)-supported alumina as a catalyst. According to the these patents, however, the reactions require high temperatures between 350 to 450° C. and high hydrogen pressures between 100 to 200 bar, and the catalysts are susceptible to coking during reactions for a long time, resulting in low yields of the products.

Hydrogenation and hydrodeoxygenation reactions are very exothermic and release a large amount of heat. It is very important to control the reaction temperatures because the amount of heat released varies depending on the kind of oils and fats with different numbers of double bonds. For example, one to five double bonds may be present in one triglyceride molecule. Accordingly, there is a difficulty in controlling the amount of heat released during the reactions. High temperature causes the occurrence of side reactions, such as cracking and aromatization reactions, other than the required hydrodeoxygenation, leading to a low yield of renewable fuels. The side reactions leave excess impurities that negatively affect the characteristics of renewable fuels and that cause coking of catalysts during long-term operation to shorten the life of the catalysts. In an attempt to prevent the occurrence of side reactions, a low reaction temperature is considered. However, a low conversion of triglycerides is a problem at the low reaction temperature.

Very high hydrogen pressures of at least 100 bar are required for the production of renewable fuels. Particularly, higher hydrogen pressures of at least 150 bar are necessary to facilitate reactions for the production of renewable fuels in higher yield because of low solubility of hydrogen in an oil or fat. For example, a very small amount (4 to 6 g) of hydrogen is dissolved in 100 g of an oil or fat at room temperature. The hydrogen solubility in an oil and fat does not increase significantly despite an increase in temperature. Accordingly, hydrogenation and hydrodeoxygenation reaction rates are determined by a mass transfer process in which gaseous hydrogen is dissolved in a liquid oil or fat. Rapid dissolution of a large amount of hydrogen in an oil or fat as a reactant increases the possibility and frequency of contact of the hydrogen with the catalyst surface. This activates the catalytic reactions, leading to high yield. If the amount of hydrogen dissolved in an oil or fat is not sufficient, the reaction rates decrease and cokes are readily formed on the catalyst surface. The coking promotes deactivation of the catalyst, leading to a low yield of a renewable fuel. Thus, there is a need to use hydrogen in a larger amount than is necessary for hydrogenation and hydrodeoxygenation reactions. Consequently, considerable equipment and operating costs are required to maintain high temperature and pressure conditions. Further costs are incurred to ensure safety against explosion of high-pressure hydrogen.

SUMMARY OF THE INVENTION

It is an object of the present invention to provide a method for producing an oxygen-free renewable fuel in a higher yield via hydrogenation and hydrodeoxygenation reactions of an oil or fat in a supercritical fluid at a lower hydrogen pressure and a lower reaction temperature than conventional methods for producing renewable fuels.

According to an aspect of the present invention, there is provided a method for producing a renewable fuel, including: charging a supported catalyst into a continuous reactor and adding a catalyst activating material thereto to activate the supported catalyst; feeding an oil or fat, hydrogen and a supercritical fluid into the continuous reactor and allowing hydrogenation and hydrodeoxygenation reactions of the oil or fat in the supercritical fluid to proceed; and collecting a renewable fuel as the reaction product.

Specifically, the method includes: charging, as a supported catalyst, at least one metal selected from the group consisting of Group 8 to Group 10 metals, nickel-molybdenum and cobalt-molybdenum supported on at least one carrier selected from the group consisting of alumina, silica, zirconia, ceria, silica aerogel and carbon aerogel into a continuous reactor, and adding hydrogen or a sulfur compound as a catalyst activating material thereto to activate the supported catalyst; feeding hydrogen, a supercritical fluid and at least one oil or fat selected from the group consisting of vegetable oils and fats, animal oils and fats and waste cooking oil into the continuous reactor, and allowing hydrogenation and hydrodeoxygenation reactions of the oil or fat in the supercritical fluid to proceed; and collecting a renewable fuel as the reaction product.

The supported catalyst is activated at a reaction temperature of 200 to 500° C. and the catalyst activating material is added at a flow rate of 10 to 200 ml/min.

The metal of the supported catalyst is one of Group 8 to Group 10 metals and the catalyst activating material is hydrogen. The one of Group 8 to Group 10 metals is nickel, palladium, platinum, ruthenium, rhodium or a combination thereof.

The metal of the supported catalyst is nickel-molybdenum or cobalt-molybdenum and the catalyst activating material is a sulfur compound. Any sulfur compound capable of activating the catalyst may be used in the method of the present invention. The sulfur compound can be selected from the group consisting of hydrogen sulfide, dimethyl sulfoxide (($CH_3$)$_2$SO, DMSO), dimethyl sulfide (($CH_3$)$_2$S, DMS) and dimethyl disulfide (($CH_3$)$_2$$S_2$, DMDS).

Any supercritical fluid capable of dissolving the oil or fat as a reactant may be used in the method of the present invention. More specifically, the supercritical fluid may be selected from the group consisting of supercritical carbon dioxide, supercritical ethane, supercritical propane, supercritical butane, supercritical pentane, supercritical hexane, supercritical heptane, supercritical dimethyl ether, supercritical tetrafluoromethane, supercritical difluoromethane and supercritical difluoroethane.

The hydrogenation and hydrodeoxygenation reactions are allowed to proceed at a temperature of 250 to 600° C. and a hydrogen pressure of 30 to 200 bar.

The supercritical fluid containing the oil or fat and the hydrogen dissolved therein passes through the supported catalyst at a liquid hourly space velocity (LHSV) of 0.1 to 3.0 $h^{-1}$.

The molar ratio of the hydrogen to triglycerides present in the oil or fat is from 0.5:1 to 20:1.

The weight ratio of the oil or fat to the supercritical fluid is from 1:0.5 to 1:20.

According to another aspect of the present invention, there is provided a method for producing a renewable fuel, including: charging a supported catalyst into a continuous reactor and adding a catalyst activating material thereto to activate the supported catalyst; feeding an oil or fat, hydrogen and a supercritical fluid into the continuous reactor and allowing hydrogenation and hydrodeoxygenation reactions of the oil or fat in the supercritical fluid to proceed; and collecting a renewable fuel as the reaction product wherein the supported catalyst is selected from the group consisting of cobalt-molybdenum/aluminum oxide (Co—Mo/$Al_2O_3$), nickel-molybdenum/aluminum oxide (Ni—Mo/$Al_2O_3$) and palladium/aluminum oxide (Pd/$Al_2O_3$) and is activated at a reaction temperature of 300 to 450° C. for 30 min to 5 hr by adding hydrogen or hydrogen sulfide as the catalyst activating material at a flow rate of 30 to 180 ml/min thereto, and soybean oil as the oil or fat is hydrogenated and hydrodeoxygenated in the supercritical fluid selected from the group consisting of supercritical carbon dioxide, supercritical ethane, supercritical propane, supercritical butane, supercritical pentane, supercritical hexane, supercritical heptane, supercritical dimethyl ether, supercritical tetrafluoromethane, supercritical difluoromethane and supercritical difluoroethane at a hydrogen pressure of 30 to 100 bar and a reaction temperature of 300 to 400° C. while passing the supercritical fluid containing the soybean oil and the hydrogen dissolved therein through the supported catalyst at a liquid hourly space velocity (LHSV) of 0.5 to 2.0 $h^{-1}$, the weight ratio of the soybean oil to the supercritical fluid being from 1:1 to 1:10 and the molar ratio of the hydrogen to triglycerides present in the soybean oil being from 2:1 to 10:1.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention relates to a method for producing an oxygen-free renewable fuel in a higher yield via hydrogenation and hydrodeoxygenation reactions of an oil or fat in a supercritical fluid at a lower hydrogen pressure and a lower reaction temperature than conventional methods for producing renewable fuels.

The present invention will now be described in detail.

The method of the present invention includes charging a supported catalyst into a continuous reactor and adding a catalyst activating material thereto to activate the supported catalyst, feeding an oil or fat, hydrogen and a supercritical fluid into the continuous reactor and allowing hydrogenation and hydrodeoxygenation reactions of the oil or fat in the supercritical fluid to proceed, and collecting a renewable fuel as the reaction product. The method of the present invention will be explained with reference to FIGS. 1 and 2.

If the method of the present invention is carried out in a batch type reactor where reaction conditions are not precisely controlled, mixing of kinetic products and thermodynamic products may appear with the passage of time, leading to a variation in the composition of a renewable fuel, and hydrogen remaining unreacted poses a danger of explosion. In view of this, it is preferred to carry out the method of the present invention in a continuous reaction.

Figure 1:
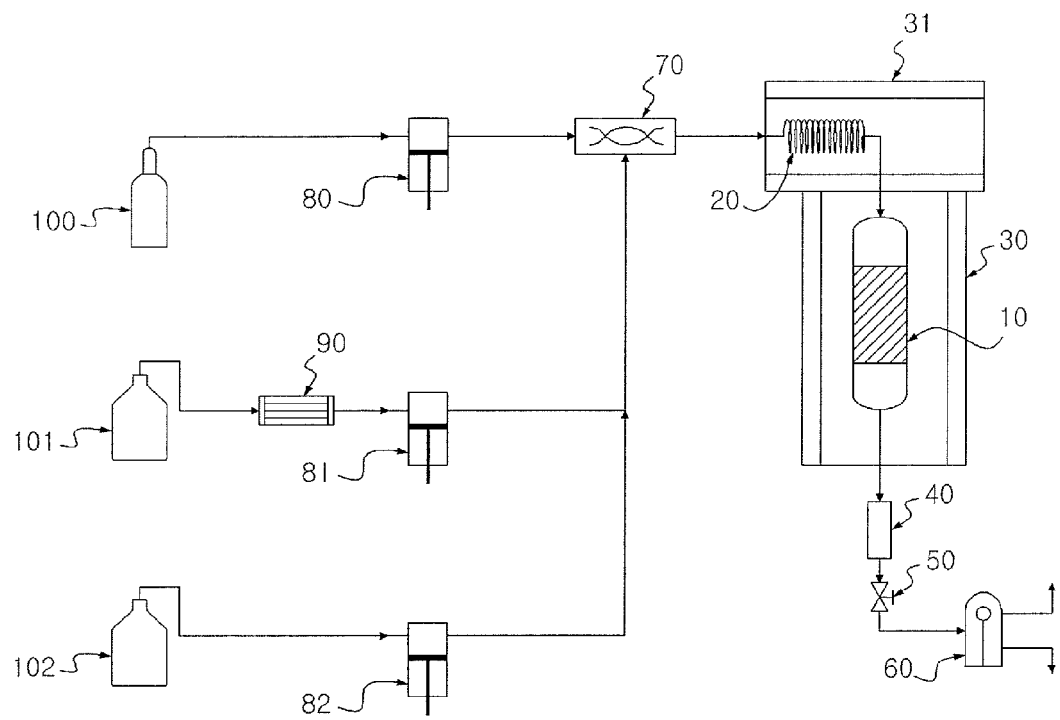
FIG. 1 illustrates an example of a system for producing a renewable fuel in accordance with a method of the present invention.
Figure 2:
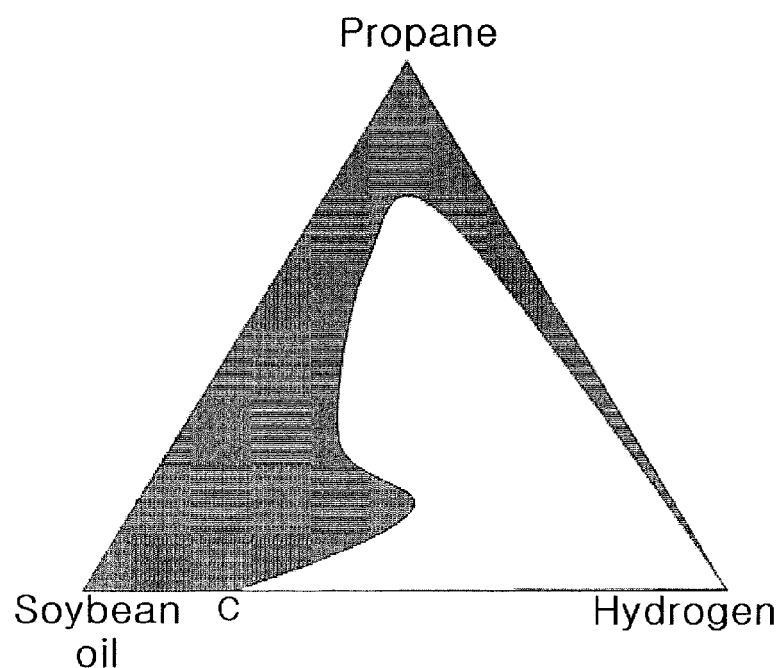
FIG. 2 is a phase diagram of soybean oil-supercritical propane-hydrogen at 130° C. and 180 bar.

FIG. 1 illustrates an example of a system for producing a renewable fuel in accordance with the method of the present invention, and FIG. 2 is a phase diagram of soybean oil-supercritical propane-hydrogen at 130° C. and 180 bar. In FIG. 2, the dark area represents a homogeneous phase of the three components and C represents the solubility of the hydrogen in the absence of the supercritical propane.

First, a supported catalyst is charged into a continuous reactor 10 and is activated by the addition of a catalyst activating material. The mixture is allowed to react for 30 min to 10 hr. The reaction temperature for activation is from 300 to 500° C., preferably 350 to 450° C. The catalyst activating material is added at a flow rate of 10 to 200 ml/min, preferably 30 to 180 ml/min.

The reaction temperature is controlled by means of heaters 30 and 31 using a preheater 20. If the reaction temperature is below 300° C., it may take a long time to activate the supported catalyst or it may be impossible to completely activate the supported catalyst. Meanwhile, if the reaction temperature exceeds 500° C., aggregation of the supported catalyst may take place, which reduces the rates of subsequent catalytic reactions.

If the flow rate of the catalyst activating material is lower than 10 ml/min, it may take a long time to activate the supported catalyst. Meanwhile, if the flow rate of the catalyst activating material is higher than 200 ml/min, the use of the excess catalyst activating material is undesirable from the viewpoint of economic efficiency.

A reaction time shorter than 30 min is not sufficient in activating the supported catalyst. Meanwhile, a reaction time longer than 10 hr does not contribute to further activation of the supported catalyst.

The supported catalyst is composed of a porous carrier having a large surface area and a metal supported on the carrier.

The carrier is not particularly limited but is preferably a metal oxide or a carbonaceous material. More preferably, the carrier is selected from the group consisting of alumina, silica, zirconia, ceria, silica aerogel and carbon aerogel.

There is no particular restriction on the shape of the carrier. For example, the carrier may have a bulk, plate, pellet, ball or powder shape.

The metal may be selected from the group consisting of Group 8 to Group 10 metals, nickel-molybdenum (Ni—Mo), cobalt-molybdenum (Co—Mo) and combinations thereof.

The Group 8 to Group 10 metals include nickel, palladium, platinum, ruthenium, rhodium, and combinations thereof.

The catalyst activating material is hydrogen or a sulfur compound. The sulfur compound can be selected from the group consisting of hydrogen sulfide, dimethyl sulfoxide ($(CH_3)_2SO$, DMSO), dimethyl sulfide ($(CH_3)_2S$, DMS) and dimethyl disulfide ($(CH_3)_2S_2$, DMDS).

When the metal of the supported catalyst is selected from Group 8 to Group 10 metals, it is preferred to use hydrogen as the catalyst activating material. Alternatively, when the metal of the supported catalyst is nickel-molybdenum or cobalt-molybdenum, it is preferred to use a sulfur compound as the catalyst activating material.

Next, an oil or fat, hydrogen and a supercritical fluid are fed from a hydrogen storage tank 100, a supercritical fluid storage tank 101 and an oil or fat storage tank 102, respectively, into the continuous reactor 10 in which the activated supported catalyst is already present. In the continuous reactor 10, hydrogenation and hydrodeoxygenation reactions of the oil or fat occur. It is preferred to mix the oil or fat, the hydrogen and the supercritical fluid supplied from the respective storage tanks 100, 101 and 102 in a mixer 70 before being fed into the reactor.

The reaction temperature is adjusted to 250 to 600° C., preferably 300 to 400° C., and the hydrogen pressure is adjusted to 30 to 200 bar, preferably 30 to 100 bar.

At a reaction temperature lower than 250° C., hydrogenation is dominant, in which the olefinic or unsaturated chain groups contained in the triglyceride chains present in the oil or fat are saturated with hydrogen and are converted to paraffinic groups, resulting in a low conversion to renewable diesel. At a reaction temperature between 250 and 400° C., decarboxylation, decarbonylation and hydrodeoxygenation reactions occur to remove oxygen atoms contained in the triglycerides, and as a result, a $C_{10}$-$C_{20}$ renewable fuel (specifically, renewable diesel) can be produced as a major product. At a reaction temperature between 400 and 600° C., cracking occurs, and as a result, a $C_6$-$C_{10}$ renewable fuel (specifically, renewable gasoline) can be produced with low selectivity to renewable diesel.

If the reaction temperature is lower than 200° C., the hydrogen and the oil or fat may not be dissolved in the supercritical fluid or effective deoxygenation reactions may not occur, resulting in a low yield of a renewable fuel. Meanwhile, if the reaction temperature is higher than 600° C., cracking actively occurs to gasify the oil or fat and coking of the supported catalyst occurs. The cracking may reduce the yield of a renewable fuel to 50% or lower and the coking makes it impossible to use the catalyst for a long time, which is economically disadvantageous and causes deterioration of long-term operating performance.

At a hydrogen pressure lower than 30 bar, only a small amount of the hydrogen is transferred to the catalyst, making it difficult to expect effective hydrogenation and hydrodeoxygenation reactions. At a hydrogen pressure higher than 200 bar, the hydrogen is used in an excess amount without increasing the yield of a renewable fuel. This is undesirable in terms of economic efficiency and makes the structure of an apparatus for reusing the excess hydrogen complicated, leading to increased equipment and operating costs.

The mixture of the oil or fat, the hydrogen and the supercritical fluid is passed through the supported catalyst at a liquid hourly space velocity (LHSV) of 0.1 to 3.0 $h^{-1}$, preferably 0.5 to 2.0 $h^{-1}$. At an LHSV lower than 0.1 $h^{-1}$, coking of the supported catalyst may occur to deactivate the supported catalyst. This deactivation reduces the yield of a renewable fuel. At an LHSV higher than 3.0 $h^{-1}$, the oil or fat/hydrogen/supercritical fluid mixture is brought into contact with the supported catalyst for a short time and thus sufficient hydrodeoxygenation is not attained. This insufficient hydrodeoxygenation reduces the yield of a renewable fuel.

The molar ratio of the hydrogen to the triglycerides present in the oil or fat is from 0.5:1 to 20:1, preferably from 2:1 to 10:1. If the number of moles of the hydrogen is below the lower limit (0.5:1), sufficient hydrogenation and hydrodeoxygenation reactions of the oil or fat are difficult to expect. In this case, a renewable fuel is produced in low yield. Meanwhile, if the number of moles of the hydrogen is above the upper limit (20:1), the hydrogen is used in an excess amount without increasing the yield of a renewable fuel. This is undesirable in terms of economic efficiency and makes the structure of an apparatus for reusing the excess hydrogen complicated, leading to increased equipment and operating costs.

The weight ratio of the oil or fat to the supercritical fluid is from 1:0.5 to 1:20, preferable from 1:1 to 1:10. If the weight of the supercritical fluid is below the lower limit (1:0.5), the effect of introducing the supercritical fluid cannot be expected because a small amount of the oil or fat is dissolved in the supercritical fluid. Meanwhile, if the weight of the supercritical fluid is above the upper limit (1:20), the productivity of a renewable fuel may be lowered because of the use of the excessive supercritical fluid and the economic efficiency may be poor because of the need to separate a renewable fuel (specifically renewable diesel) and the supercritical fluid.

The oil or fat is not particularly limited and can be selected from the group consisting of vegetable oils and fats, animal oils and fats, waste cooking oil and mixtures thereof. Examples of the vegetable oils and fats include palm oil, corn oil, sunflower oil, olive oil, soybean oil, rapeseed oil, cottonseed oil, rice bran oil and coconut oil. Examples of the animal oils and fats include beef tallow, lard, sheep tallow and fish oil.

The supercritical fluid may be any one capable of dissolving both the hydrogen and the oil or fat. Specifically, the supercritical fluid can be selected from the group consisting of supercritical carbon dioxide, supercritical ethane, supercritical propane, supercritical butane, supercritical pentane, supercritical hexane, supercritical heptane, supercritical dimethyl ether, supercritical tetrafluoromethane, supercritical difluoromethane and supercritical difluoroethane. The critical temperatures and critical pressures of the supercritical fluids are summarized in Table 1.

TABLE 1

| Supercritical fluid | Critical Temperature (° C.) | Critical pressure (bar) |
|---|---|---|
| Supercritical carbon dioxide | 31.1 | 73.8 |
| Supercritical ethane | 32.3 | 48.8 |
| Supercritical propane | 96.7 | 42.5 |
| Supercritical butane | 152.1 | 38.0 |
| Supercritical pentane | 197.1 | 33.7 |
| Supercritical hexane | 234.1 | 29.7 |
| Supercritical heptane | 267.1 | 27.4 |
| Supercritical dimethyl ether | 126.9 | 52.4 |
| Supercritical tetrafluoromethane | −45.6 | 37.4 |
| Supercritical difluoromethane | 78.5 | 53.4 |
| Supercritical difluoroethane | 113.1 | 45.2 |

The frequency of contact of the oil or fat and the hydrogen with the supported catalyst is an important factor in the hydrogenation and hydrodeoxygenation reactions of the oil or fat.

According to a prior art method, a high hydrogen pressure is used to increase the low solubility of hydrogen in an oil or fat (see C in FIG. 2). A gas phase in which most of the hydrogen is present is separated from a liquid phase in which most of the oil or fat is present. A gas-liquid interface exists between the gas and liquid phases and a solid-phase supported catalyst is present in the liquid phase. For hydrogenation, the gaseous hydrogen should undergo a process in which the hydrogen is transferred to the liquid phase and a process in which the hydrogen dissolved in the liquid phase is transferred to the surface of the solid-phase supported catalyst. That is, the gas-liquid-solid phase transfer processes of the hydrogen are rate-determining steps for the production of a renewable fuel.

In contrast, according to the method of the present invention, the hydrogen and the oil or fat as reactants are easily dissolved in the supercritical fluid (see the hydrogen-supercritical propane-soybean oil phase diagram of FIG. 2) to form a homogeneous phase, which simplifies the processes of the hydrogen transferred to the solid-phase supported catalyst. That is, the hydrogen is transferred to the solid-phase supported catalyst through a supercritical fluid phase-solid phase transfer process. Therefore, the reactions can proceed more effectively than in the case where the supercritical fluid is absent. The oil or fat may not be dissolved in the supercritical fluid. Even in this case, since the supercritical fluid dissolves the hydrogen and greatly reduces the viscosity of the oil or fat, the hydrogen is rapidly transferred to the supported catalyst, allowing the reactions to proceed effectively.

Therefore, in the case of producing a renewable fuel in a supercritical fluid via catalytic reactions, as in the method of the present invention, high solubility of hydrogen in the supercritical fluid, the absence of a gas-liquid interface, and fast mass transfer rate even at relatively low hydrogen pressure can increase the transfer rates of hydrogen and an oil or fat as reactants, enabling the production of the renewable fuel in high yield.

In addition, organic materials causing coking of the supported catalyst are highly soluble in the supercritical fluid and are rapidly diffused into the supercritical fluid. That is, the use of the supercritical fluid prevents the supported catalyst from coking, so that the activity of the supported catalyst is maintained despite long-term use. Furthermore, the supercritical fluid can effectively control the exothermal reactions in the production of a renewable fuel to increase the selectivity to diesel because of its higher density and heat transfer rate than those of gaseous fluids at the same temperature.

Next, products of the hydrogenation and hydrodeoxygenation reactions are separated and collected from the continuous reactor 10.

The products are gaseous carbon dioxide, gaseous carbon monoxide, water and a renewable fuel. The products are discharged from a back-pressure regulator positioned at a discharge port through a cooler 40 and a gas-liquid separator 60. At this time, the supercritical fluid is included in the gaseous and liquid products. The supercritical fluid included in the liquid product is, for example, hexane or heptane that exists in the form of a liquid at ambient temperature and ambient pressure.

The water is separated through phase separation. The supercritical fluid that is a gas at ambient pressure can be separated using the gas-liquid separator, and the supercritical fluid that is a liquid at ambient pressure can be separated by fractional distillation. A mixture of the renewable fuel and hexane or heptane as the supercritical fluid can be directly used as a fuel without further separation.

In a most preferred embodiment, the supported catalyst is selected from the group consisting of cobalt-molybdenum/aluminum oxide (Co—Mo/$Al_2O_3$), nickel-molybdenum/aluminum oxide (Ni—Mo/$Al_2O_3$) and palladium/aluminum oxide (Pd/$Al_2O_3$) and is activated at a reaction temperature of 300 to 450° C. for 30 min to 5 hr by adding hydrogen or hydrogen sulfide as the catalyst activating material at a flow rate of 30 to 180 ml/min thereto, and soybean oil as the oil or fat is hydrogenated and hydrodeoxygenated in the supercritical fluid selected from the group consisting of supercritical carbon dioxide, supercritical ethane, supercritical propane, supercritical butane, supercritical pentane, supercritical hexane, supercritical heptane, supercritical dimethyl ether, supercritical tetrafluoromethane, supercritical difluoromethane and supercritical difluoroethane at a hydrogen pressure of 30 to 100 bar and a reaction temperature of 300 to 400° C. while passing the supercritical fluid containing the soybean oil and the hydrogen dissolved therein through the supported catalyst at a liquid hourly space velocity (LHSV) of 0.5 to 2.0 $h^{-1}$, the weight ratio of the soybean oil to the supercritical fluid being from 1:1 to 1:10 and the molar ratio of the hydrogen to triglycerides present in the soybean oil being from 2:1 to 10:1.

Out of one of the ranges defined above, only hydrogenation of the oil or fat may take place, a renewable fuel (specifically renewable diesel) may not be obtained, and only a small amount of the hydrogen may be dissolved in the supercritical fluid, undesirably resulting in a low yield of a renewable fuel.

As described above, when the oil or fat undergoes hydrogenation and hydrodeoxygenation reactions in the supercritical fluid in the presence of the supported catalyst, a renewable fuel can be produced in a yield as high as 80 to 95% at low hydrogen pressure and low reaction temperature.

The following examples are provided to assist in a further understanding of the invention but are intended for illustrative purposes only. Therefore, it will be evident to those skilled in the art that various modifications and changes can be made without departing from the scope and spirit of the invention and such modifications and changes are encompassed within the scope of the appended claims.

EXAMPLES

Example 1

20 g of Co—Mo/$Al_2O_3$ (Co 2.8 wt %, Mo 7.6 wt %) as a catalyst was introduced into a 120 ml continuous reactor and was thermally treated with nitrogen (flow rate=100 ml/min) at 350° C. Thereafter, 15 vol % $H_2S/H_2$ at 400° C. was allowed to flow at a rate of 50 ml/min for 3 hr to activate the catalyst. After the reaction temperature was reduced to 300° C., a mixture of hydrogen, soybean oil and supercritical hexane was introduced into the continuous reactor. In the mixture, the hydrogen/soybean oil molar ratio was adjusted to 9.6:1 and the soybean oil/supercritical hexane weight ratio was adjusted to 1:1. The mixture was allowed to react at a hydrogen pressure of 50 bar for 5 hr while maintaining the liquid hourly space velocity at 2.0 $h^{-1}$. After liquid products from a discharge port of the continuous reactor were collected per one hour, a renewable fuel was separated from the hexane by fractional distillation.

Example 2

A renewable fuel was produced in the same manner as in Example 1, except that supercritical propane was used instead of the supercritical hexane and the fractional distillation was omitted.

Example 3

A renewable fuel was produced in the same manner as in Example 1, except that supercritical carbon dioxide was used instead of the supercritical hexane, the fractional distillation was omitted and the hydrogen pressure was changed to 80 bar.

Example 4

A renewable fuel was produced in the same manner as in Example 1, except that 15 vol % $H_2S/H_2$ at 300° C. was allowed to flow at a rate of 20 ml/min to activate the catalyst.

Example 5

A renewable fuel was produced in the same manner as in Example 1, except that after the reaction temperature was reduced to 250° C., hydrogen, soybean oil and supercritical hexane were introduced into the continuous reactor and the hydrogen pressure was adjusted to 30 bar.

Example 6

A renewable fuel was produced in the same manner as in Example 1, except that the hydrogen/soybean oil molar ratio was changed to 5:1.

Example 7

A renewable fuel was produced in the same manner as in Example 1, except that the soybean oil/supercritical hexane weight ratio was changed to 1:4.

Example 8

A renewable fuel was produced in the same manner as in Example 1, except that the liquid hourly space velocity was changed to 0.5 $h^{-1}$.

Example 9

A renewable fuel was produced in the same manner as in Example 1, except that 20 g of 5 wt % $Pd/Al_2O_3$ was used as a catalyst and $H_2$ at 400° C. was allowed to flow at a rate of 50 ml/min for 3 hr to activate the catalyst.

Example 10

10 g of 5 wt % $Pd/Al_2O_3$ as a catalyst was introduced into a 120 ml continuous reactor and was thermally treated with nitrogen (flow rate=100 ml/min) at 350° C. Thereafter, $H_2$ at 400° C. was allowed to flow at a rate of 50 ml/min for 3 hr to activate the catalyst. After the reaction temperature was reduced to 320° C., a mixture of hydrogen, soybean oil and supercritical propane was introduced into the continuous reactor. In the mixture, the hydrogen/soybean oil molar ratio was adjusted to 9.6:1 and the soybean oil/supercritical propane weight ratio was adjusted to 1:1. The mixture was allowed to react at a hydrogen pressure of 50 bar for 50 hr while maintaining the liquid hourly space velocity at 2.0 $h^{-1}$. After liquid products from a discharge port of the continuous reactor were collected per one hour, a renewable fuel was separated by fractional distillation.

Comparative Example 1

20 g of Co—Mo/$Al_2O_3$ (Co 2.8 wt %, Mo 7.6 wt %) as a catalyst was introduced into a 120 ml continuous reactor and was thermally treated with nitrogen (flow rate=100 ml/min) at 350° C. Thereafter, $H_2S/H_2$ at 400° C. was allowed to flow at a rate of 50 ml/min for 3 hr to activate the catalyst. After the reaction temperature was reduced to 300° C., a mixture of hydrogen and soybean oil in a molar ratio of 9.6:1 was introduced into the continuous reactor. The mixture was allowed to react at a pressure of 50 bar while maintaining the liquid hourly space velocity at 2.0 $h^{-1}$. Liquid products from a discharge port of the continuous reactor were collected per one hour.

Comparative Example 2

A renewable fuel was produced in the same manner as in Comparative Example 1, except that 20 g of 5 wt % $Pd/Al_2O_3$ was used as a catalyst.

Comparative Example 3

10 g of 5 wt % $Pd/Al_2O_3$ as a catalyst was introduced into a 120 ml continuous reactor and was thermally treated with nitrogen (flow rate=100 ml/min) at 350° C. Thereafter, $H_2$ at 400° C. was allowed to flow at a rate of 50 ml/min for 3 hr to activate the catalyst. After the reaction temperature was reduced to 320° C., a mixture of hydrogen and soybean oil in a molar ratio of 9.6:1 was introduced into the continuous reactor. The mixture was allowed to react at a pressure of 50 bar for 50 hr while maintaining the liquid hourly space velocity at 2.0 $h^{-1}$. After liquid products from a discharge port of the continuous reactor were collected per one hour, a renewable fuel was separated by fractional distillation.

Test Example 1

The conversion of the soybean oil to each of the renewable fuels in Examples 1-10 and Comparative Examples 1-3 and the selectivities of the soybean oil to naphtha, kerosene/jet and diesel were defined based on the weights of the soybean oil participating in the reactions and the weights of the components separated from the collected renewable fuel by the following equations. The conversion and selectivity were measured using gas a chromatograph equipped a Sim Dis capillary column and a flame ionization detector (FID) (Perkin-Elmer model Clarus 600). The simulated distillation of hydroprocessed products was carried out according to the ASTM D-7213 procedure under an assumption that the areas of each distillation fraction were proportional to the amount of carbon in that fraction.

1.

$$\text{Conversion (\%)} = (\text{Feed}_{360+} - \text{Product}_{360+}) / \text{Feed}_{360+} \times 100 \quad (1)$$

2.

$$\text{Naphtha selectivity (\%)} = (\text{Product}_{40\text{-}200} - \text{Feed}_{40\text{-}200}) / (\text{Feed}_{360+} - \text{Product}_{360+}) \times 100 \quad (2)$$

3.

$$\text{Kerosene/jet selectivity (\%)} = (\text{Product}_{170\text{-}270} - \text{Feed}_{170\text{-}270}) / (\text{Feed}_{360+} - \text{Product}_{360+}) \times 100 \quad (3)$$

4.

$$\text{Diesel selectivity (\%)} = (\text{Product}_{180\text{-}360} - \text{Feed}_{180\text{-}360}) / (\text{Feed}_{360+} - \text{Product}_{360+}) \times 100 \quad (4)$$

The numbers appearing as the subscripts in Equations 1-4 indicate the boiling point ranges of the corresponding components. For example, diesel has a boiling point of 180 to 360° C. ($_{180\text{-}360}$) and triglycerides contained in the soybean oil have a boiling point of 360° C. or higher ($_{360+}$). The conversion was calculated from the amount of the reactant (b.p. ≥360° C.) reacted relative to the amount of the reactant fed. The selectivity to each of the components with having different boiling points was calculated from the amount of the component formed relative to the amount of the triglycerides reacted.

5. Alkane content (wt %): The content of alkanes was measured using a gas chromatograph (GC) equipped with a FID (Agilent).

6. Discharge of solid waxes: Visual observation was made as to whether waxes were discharged.

The conversion, the naphtha, kerosene/jet and diesel selectivities, alkane content and discharge of solid waxes are shown in Table 2.

When Co—Mo/$Al_2O_3$ was used as a catalyst, n-alkanes, which are major components of diesel produced by decarboxylation, decarbonylation and hydrodeoxygenation reactions, accounted for 51-66 wt % of the total weight of the renewable fuel, revealing that isomerization and aromatization reactions further proceeded.

When Pd/$Al_2O_3$ was used as a catalyst instead of Co—Mo/$Al_2O_3$, the content of n-alkanes produced by decarboxylation, decarbonylation and hydrodeoxygenation reactions was 85% relative to the total weight of the renewable fuel, revealing that isomerization and aromatization reactions were suppressed.

In Comparative Examples 1 and 2, the activities of the catalysts were greatly deteriorated after 1-hr reactions and a large amount of solid waxes was discharged together with the products after 3-hr reactions.

Figure 4:
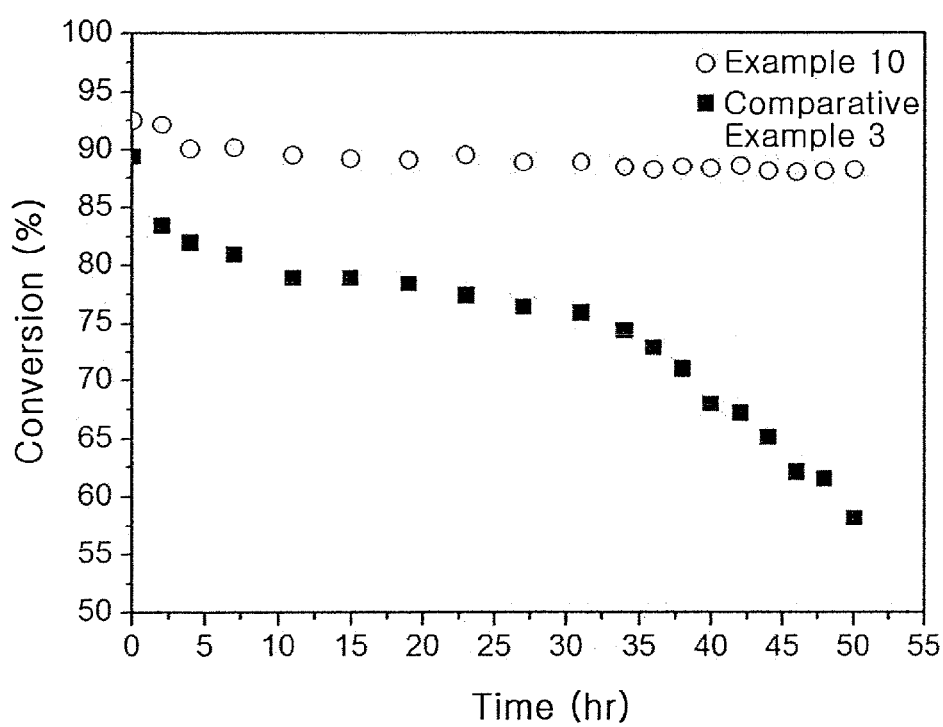
FIG. 4 is a graph showing the results of evaluation of the long-term operating performance of renewable fuels produced in Example 10 and Comparative Example 3.

In Example 10 and Comparative Example 3, the reactions were allowed to proceed in the continuous reactors for 50 hr. As shown in FIG. 4, the conversion was 88% or higher even after 50 hr in Example 10, confirming that there was no significant yield reduction arising from the coking of the catalyst when the renewable diesel was produced in the supercritical fluid. In Comparative Example 3, the conversion began to decrease after 30-hr reactions in the continuous reactor and reached a very low value (58%) after 50-hr reactions, demonstrating that the catalyst was deactivated.

Test Example 2

The purities of the renewable fuels produced in Examples 1-3 and Comparative Example 1 were measured using a simulated distillation (simdis)-GC equipped with a FID (Perkin-Elmer). The results are graphically shown in FIG. 3.

Figure 3:
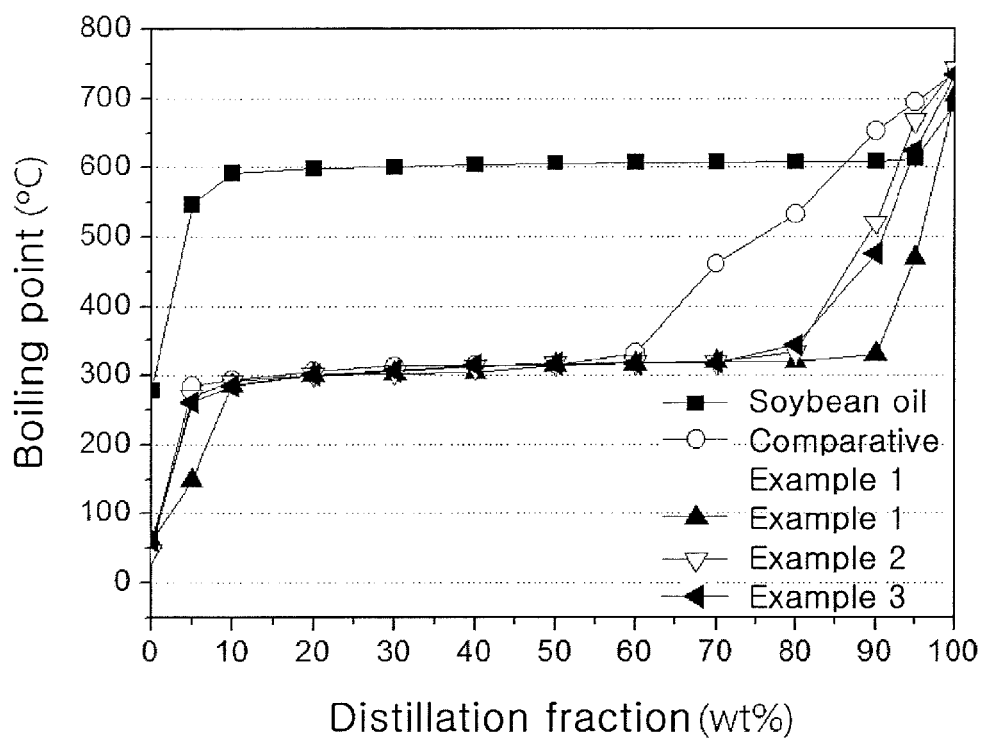
FIG. 3 is a graph showing the measured yields of renewable fuels produced in Examples 1-3 and Comparative Example 1.

As shown in FIG. 3, larger amounts of products having higher boiling points than diesel oil were produced in Comparative Example 1 than in Examples 1-3. These results confirm that the renewable fuels were produced in higher yields when the supercritical fluid was used than when no supercritical fluid was used.

As is apparent from the foregoing, the method of the present invention enables the production of an oxygen-free

TABLE 2

|  | Conversion (%) | Naphtha selectivity (%) | Kerosene/jet selectivity (%) | Diesel selectivity (%) | n-alkane (wt %) | Discharge of waxes |
|---|---|---|---|---|---|---|
| Example 1 | 94 | 1.0 | 3.2 | 99.5 | 66 | Not discharged |
| Example 2 | 89 | 1.7 | 4.5 | 98.9 | 51 | Not discharged |
| Example 3 | 86 | 2.3 | 5.8 | 96.9 | 53 | Not discharged |
| Example 4 | 87 | 1.5 | 5.9 | 95.8 | 60 | Not discharged |
| Example 5 | 89 | 2.2 | 3.6 | 98.1 | 61 | Not discharged |
| Example 6 | 88 | 1.9 | 4.7 | 98.8 | 59 | Not discharged |
| Example 7 | 95 | 2.8 | 4.9 | 98.6 | 58 | Not discharged |
| Example 8 | 94 | 1.9 | 5.0 | 98.1 | 59 | Not discharged |
| Example 9 | 95 | 2.0 | 4.3 | 98.2 | 85 | Not discharged |
| Comparative Example 1 | 59 | 1.5 | 2.9 | 51.7 | 20 | Discharged |
| Comparative Example 2 | 68 | 1.8 | 2.5 | 97.2 | 88 | Discharged |

As shown in Table 2, the conversions to the renewable fuels (yields of the renewable fuels) in Examples 1-9 were higher than those of the renewable fuels in Comparative Examples 1 and 2. In addition, the diesel selectivities in Examples 1-9 were higher than those in Comparative Examples 1 and 2. From these results, it can be confirmed that the renewable fuels of Examples 1-9 are suitable for use as diesel fuels.

renewable fuel in a higher yield at a lower hydrogen pressure and a lower reaction temperature than the conventional methods for producing renewable fuels.

In addition, an oxygen-free renewable fuel produced by the method of the present invention can be directly used as a fuel of an existing gasoline or diesel engine without the need to modify the engine structure.

Furthermore, the lower hydrogen pressure and reaction temperature conditions used in the method of the present invention contribute to the reduction of equipment and operating costs, thus being economically advantageous.

Moreover, according to the method of the present invention, the supported catalyst can be prevented from coking, which is a cause of deactivation of the supported catalyst to reduce the yield of a renewable fuel, and can be prevented from deterioration in activity, enabling long-term operation without loss of activity for a long time.

What is claimd is:

1. A method for producing a renewable fuel, comprising:
   charging a supported catalyst into a continuous reactor and adding a catalyst activating material thereto to activate the supported catalyst;
   feeding an oil or fat, hydrogen and a supercritical fluid into the continuous reactor and allowing hydrogenation and hydrodeoxygenation reactions of the oil or fat in the supercritical fluid to proceed; and
   collecting a renewable fuel as the reaction product.

2. The method according to claim 1, wherein the method comprises:
   charging, as the supported catalyst, at least one metal selected from the group consisting of Group 8 to Group 10 metals, nickel-molybdenum and cobalt-molybdenum supported on at least one carrier selected from the group consisting of alumina, silica, zirconia, ceria, silica aerogel and carbon aerogel into a continuous reactor, and adding hydrogen or a sulfur compound as the catalyst activating material thereto to activate the supported catalyst;
   feeding hydrogen, a supercritical fluid and at least one oil or fat selected from the group consisting of vegetable oils and fats, animal oils and fats and waste cooking oil into the continuous reactor, and allowing hydrogenation and hydrodeoxygenation reactions of the oil or fat in the supercritical fluid to proceed; and
   collecting the renewable fuel as the reaction product.

3. The method according to claim 1, wherein the supported catalyst is activated at a reaction temperature of 300 to 500° C. and the catalyst activating material is added at a flow rate of 10 to 200 ml/min.

4. The method according to claim 1, wherein the metal of the supported catalyst is one of Group 8 to Group 10 metals and the catalyst activating material is hydrogen.

5. The method according to claim 1, wherein the one of Group 8 to Group 10 metals is nickel, palladium, platinum, ruthenium, rhodium or a combination thereof.

6. The method according to claim 1, wherein the metal of the supported catalyst is nickel-molybdenum or cobalt-molybdenum and the catalyst activating material is a sulfur compound.

7. The method according to claim 6, wherein the sulfur compound is selected from the group consisting of hydrogen sulfide ($H_2S$), dimethyl sulfoxide (($CH_3)_2SO$, DMSO), dimethyl sulfide (($CH_3)_2S$, DMS) and dimethyl disulfide (($CH_3)_2S_2$, DMDS).

8. The method according to claim 1, wherein the supercritical fluid is selected from the group consisting of supercritical carbon dioxide, supercritical ethane, supercritical propane, supercritical butane, supercritical pentane, supercritical hexane, supercritical heptane, supercritical dimethyl ether, supercritical tetrafluoromethane, supercritical difluoromethane and supercritical difluoroethane.

9. The method according to claim 1, wherein the hydrogenation and hydrodeoxygenation reactions are allowed to proceed at a temperature of 250 to 600° C. and a hydrogen pressure of 30 to 200 bar.

10. The method according to claim 1, wherein the supercritical fluid containing the oil or fat and the hydrogen dissolved therein passes through the supported catalyst at a liquid hourly space velocity (LHSV) of 0.1 to 3.0 $h^{-1}$.

11. The method according to claim 1, wherein the molar ratio of the hydrogen to triglycerides present in the oil or fat is from 0.5:1 to 20:1.

12. The method according to claim 1, wherein the weight ratio of the oil or fat to the supercritical fluid is from 1:0.5 to 1:20.

13. A method for producing a renewable fuel, comprising:
   charging a supported catalyst into a continuous reactor and adding a catalyst activating material thereto to activate the supported catalyst;
   feeding an oil or fat, hydrogen and a supercritical fluid into the continuous reactor and allowing hydrogenation and hydrodeoxygenation reactions of the oil or fat in the supercritical fluid to proceed; and
   collecting a renewable fuel as the reaction product, wherein the supported catalyst is selected from the group consisting of cobalt-molybdenum/aluminum oxide (Co—Mo/$Al_2O_3$), nickel-molybdenum/aluminum oxide (Ni—Mo/$Al_2O_3$) and palladium/aluminum oxide (Pd/$Al_2O_3$) and is activated at a reaction temperature of 300 to 450° C. for 30 min to 5 hr by adding hydrogen or hydrogen sulfide as the catalyst activating material at a flow rate of 30 to 180 ml/min thereto, and soybean oil as the oil or fat is hydrogenated and hydrodeoxygenated in the supercritical fluid selected from the group consisting of supercritical carbon dioxide, supercritical ethane, supercritical propane, supercritical butane, supercritical pentane, supercritical hexane, supercritical heptane, supercritical dimethyl ether, supercritical tetrafluoromethane, supercritical difluoromethane and supercritical difluoroethane at a hydrogen pressure of 30 to 100 bar and a reaction temperature of 300 to 400° C. while passing the supercritical fluid containing the soybean oil and the hydrogen dissolved therein through the supported catalyst at a liquid hourly space velocity (LHSV) of 0.5 to 2.0 $h^{-1}$, the weight ratio of the soybean oil to the supercritical fluid being from 1:1 to 1:10 and the molar ratio of the hydrogen to triglycerides present in the soybean oil being from 2:1 to 10:1.

14. A method for producing a renewable fuel, the method comprising:
   charging a supported catalyst into a continuous reactor and adding a catalyst activating material that comprises a sulfur compound thereto to activate the supported catalyst;
   feeding an oil or fat, hydrogen and a supercritical fluid into the continuous reactor and allowing hydrogenation and hydrodeoxygenation reactions of the oil or fat in the supercritical fluid to proceed into a renewable fuel; and
   collecting the renewable fuel as the reaction product.

15. The method according to claim 14, wherein
   charging of the supported catalyst comprises using at least one metal selected from the group consisting of Group 8 to Group 10 metals, nickel-molybdenum and cobalt-molybdenum supported on at least one carrier selected from the group consisting of alumina, silica, zirconia, ceria, silica aerogel and carbon aerogel into a continuous reactor, and adding hydrogen or the sulfur compound as the catalyst activating material thereto to activate the supported catalyst;

feeding hydrogen, the supercritical fluid and at least one oil or fat selected from the group consisting of vegetable oils and fats, animal oils and fats and waste cooking oil into the continuous reactor, and allowing hydrogenation and hydrodeoxygenation reactions of the oil or fat in the supercritical fluid to proceed.

16. The method according to claim 14, wherein the sulfur compound is selected from the group consisting of hydrogen sulfide ($H_2S$), dimethyl sulfoxide (($CH_3$)$_2$SO, DMSO), dimethyl sulfide (($CH_3$)$_2$S, DMS) and dimethyl disulfide (($CH_3$)$_2$$S_2$, DMDS).

17. The method according to claim 14, wherein the supercritical fluid is selected from the group consisting of supercritical carbon dioxide, supercritical ethane, supercritical propane, supercritical butane, supercritical pentane, supercritical hexane, supercritical heptane, supercritical dimethyl ether, supercritical tetrafluoromethane, supercritical difluoromethane and supercritical difluoroethane.

\* \* \* \* \*